United States Patent
Castaing et al.

(10) Patent No.: US 10,183,891 B2
(45) Date of Patent: Jan. 22, 2019

(54) STABILISATION OF MINERAL FOAMS

(71) Applicant: RHODIA OPERATIONS, Paris (FR)

(72) Inventors: Jean-Christophe Castaing, Sevres (FR); Katerina Karegianni, Paris (FR); Marie-Pierre Labeau, Sevres (FR); Arnaud Vanberleere, Rueil-Malmaison (FR)

(73) Assignee: RHODIA OPERATIONS, Paris (FR)

(*) Notice: Subject to any disclaimer, the term of this patent is extended or adjusted under 35 U.S.C. 154(b) by 0 days.

(21) Appl. No.: 15/737,574

(22) PCT Filed: Jun. 20, 2016

(86) PCT No.: PCT/EP2016/064162
§ 371 (c)(1),
(2) Date: Dec. 18, 2017

(87) PCT Pub. No.: WO2016/207105
PCT Pub. Date: Dec. 29, 2016

(65) Prior Publication Data
US 2018/0155243 A1  Jun. 7, 2018

(30) Foreign Application Priority Data
Jun. 22, 2015  (FR) ..................... 15 01289

(51) Int. Cl.
| C04B 24/16 | (2006.01) |
| C04B 30/00 | (2006.01) |
| C04B 24/12 | (2006.01) |
| C04B 24/26 | (2006.01) |
| C04B 28/02 | (2006.01) |
| C04B 111/40 | (2006.01) |
| C04B 103/30 | (2006.01) |
| C04B 103/40 | (2006.01) |

(52) U.S. Cl.
CPC ............ *C04B 24/16* (2013.01); *C04B 24/121* (2013.01); *C04B 24/123* (2013.01); *C04B 24/2652* (2013.01); *C04B 28/02* (2013.01); *C04B 30/00* (2013.01); *C04B 2103/30* (2013.01); *C04B 2103/402* (2013.01); *C04B 2103/406* (2013.01); *C04B 2111/40* (2013.01)

(58) Field of Classification Search
CPC ..... C04B 24/16; C04B 24/121; C04B 24/123; C04B 24/2652; C04B 28/02; C04B 30/00; C04B 2111/40; C04B 2103/402; C04B 2103/406
See application file for complete search history.

(56) References Cited

U.S. PATENT DOCUMENTS

| 5,591,701 A * | 1/1997 | Thomas ................... C09K 8/38 507/203 |
| 2007/0203029 A1* | 8/2007 | Chatterji ................ C09K 8/703 507/254 |
| 2014/0039066 A1* | 2/2014 | Grimadell .............. A61K 8/046 514/723 |
| 2015/0083958 A1* | 3/2015 | Bernardi ................. C04B 28/02 252/62 |

FOREIGN PATENT DOCUMENTS

| EP | 1088632 A2 | 4/2001 |
| EP | 1088800 A2 | 4/2001 |
| FR | 2933687 A1 | 1/2010 |
| WO | 2013060741 A1 | 5/2013 |

* cited by examiner

*Primary Examiner* — Anthony J Green

(57) ABSTRACT

The invention relates to a mineral foam stabilized by an association of surfactants comprising: a first surfactant carrying at least one sulfate group; and a second amphoteric surfactant.

9 Claims, No Drawings

STABILISATION OF MINERAL FOAMS

This application is a U.S. national phase entry under 35 U.S.C. § 371 of International Application No. PCT/EP2016/064162, filed on Jun. 20, 2016, which claims priority to French Application No. 15 01289, filed on Jun. 22, 2015. The entire contents of these applications are being incorporated herein by this reference.

The present invention relates to the domain of what are called "mineral foams," i.e. foams formed from water and surfactants and in contact (generally intimately mixed) with mineral particles. The invention relates more specifically to the stabilization of this type of foam, in particular, but not in a limiting manner, in the presence of water-repellent components.

Various applications exist for foams that involve putting them in contact with mineral particles. This is in particular the case when the foam is formed in the presence of mineral particles and more particularly when it is employed to transport such mineral particles (transport of solids during excavation or mining operations for example).

More specific examples of mineral foams are foams made of plaster or cement materials intended for the preparation of lightweight construction materials, where it is well-known that the presence of mineral particles tends to destabilize the foam. The problem of stabilization is more particularly an issue when the goal is to produce water-repellent materials (for the production of plasterboard for bathrooms or kitchens, typically), where the water-repellent agents tend to break the foam.

A goal of the present invention is to provide a means of forming mineral foams as previously cited that are stable and can typically maintain good foam integrity during operations of shaping and drying plasterboard, preferably including when they comprise water-repellent agents.

For this purpose, the present invention proposes using a combination of at least two surfactants to form the foam, i.e.:
at least one first surfactant (S1) bearing at least one sulfate group; and
at least one second surfactant (S2) that is amphoteric.

More specifically, according to a first feature, the present invention relates to mineral foams comprising water, mineral particles and the combination of previously cited surfactants S1 and S2, where the composition may comprise or not comprise water-repellent agents. The invention also relates to the uses of these foams, in particular in the domain of transporting mineral particles or, more specifically, for the formation of lightweight building materials.

According to another feature, the present invention relates to the use of previously cited surfactants S1 and S2 to form a stable foam suitable for putting in contact with mineral particles, in particular particles of plaster, with or without water-repellent agents.

The work of the inventors has now demonstrated that the combination of the previously cited surfactants S1 and S2 produces effective foam stabilization, in particular with good foam volume maintenance over time.

Various specific embodiments will now be described in more detail.

The First Surfactant (S1)

This is a surfactant bearing at least one sulfate group. Alternatively, this may be a mixture of several (two or more) surfactants of this type.

The first surfactant may typically comprise a hydrophobic chain with a terminal sulfate group. It may also be a compound bearing a hydrophobic chain bearing several sulfate groups. According to an embodiment, the first surfactant S1 may be a polymer, for example a polymer bearing a hydrophobic chain on which side groups bearing sulfate groups are grafted.

In a non-limiting manner, surfactant S1 may be chosen from:
alkyl ether sulfates, in particular C8-C18 alkyl ether sulfates, for example C12 and C13 alkyl ether sulfates;
alkyl sulfates, in particular C8-C18 alkyl sulfates, such as for example C12 alkyl sulfate;
mixtures of two or more of these compounds.

Surfactant S1 may for example be chosen from the following commercially available products, available from Solvay:
Rhodapex® ESB70 SLES and EST 65 STES
Rhodapon LX 28 AF3 SLS
mixtures of two or more of these compounds.

The Second Surfactant (S2)

The second surfactant is typically employed as a co-surfactant, with a S2/S1 mass ratio typically between 1:15 and 1:4, for example between 1:10 and 1:5.

In a non-limiting manner, surfactant S2 may be chosen from:
amine oxides;
glycinates;
sultaines;
mixtures of two or more of these compounds.

Surfactant S2 may for example be chosen from the following commercially available products, available from Solvay:
Fentacare OA12;
Geroppon CG 3S Glucinate;
mixtures of these compounds.

Interesting mixtures according to the invention comprise:
a mixture of an alkyl ether sulfate as previously cited and an amine oxide (Rhodapex® ESB70 SLES+Fentacare OA12 for example), with optionally an additional amphoteric surfactant (glycinate for example);
a mixture of an alkyl ether sulfate as previously cited, an alkyl sulfate and an amine oxide (Rhodapex® ESB70 SLES and/or EST 65 STES+Rhodapon LX 28 AF3 SLS+Fentacare OA12 for example)

The Mineral Foams Formed from Surfactants S1 and S2

A mineral foam formed with the surfactants according to the invention contains water, mineral particles and the mixture of surfactants S1 and S2.

The mixture of surfactants S1 and S2 generally represents between 0.01% and 0.05% by mass, for example between 0.02% and 0.03% by mass, typically of the order of 0.02% by mass relative to the dry mass of mineral particles, and most particularly when the mineral particles are particles of plaster.

Moreover, the mixture of surfactants S1 and S2 typically represents between 5% and 30% by mass, more particularly between 15% and 25% by mass relative to the total mass of the surfactants and the water.

As well as the previous components, the mineral foam may optionally comprise other additives.

It is sometimes interesting to add cationic compounds, in particular cationic polymers. An interesting cationic compound is a DADMAC polymer or copolymer (diallyldimethylammonium chloride), such as for example a vinylpyrolidone/DADMAC copolymer with a vinylpyrolidone/DADMAC ratio typically between 70/30 and 90/10, for example of the order of 80/20.

The examples below illustrate possible non-limiting embodiments of the invention.

EXAMPLE

Three surfactant formulations according to the invention have been tested, which have the compositions reported in table below (where the masses of each component are in grams)

TABLE

|  | Formulation 1 | Formulation 2 | Formulation 3 |
|---|---|---|---|
| Rhodapex ® ESB 70<br>Lauryl ether sulfate | 15.68 | 7.84 | 19.6 |
| Rhodapon ® LX 28 AF3<br>Sodium lauryl sulfate |  | 3.84 |  |
| Rhodapex ® EST 65<br>Sodium tridecyl ether sulfate |  | 4.16 |  |
| Fentacare ® OA 12<br>Amine oxide | 4.32 | 2.736 | 2.1 |
| Geroppon ® CG 3S<br>Glycine N-coco acyl | 0.8 |  |  |
| Statistical copolymer<br>vinylpyrolidone/DADMAC<br>80/20 |  |  | 1.6 |
| Water | 79.2 | 81.4 | 77.5 |

The three formulations all stabilize foam well, with good maintenance of foam volume, greater than that observed with a standard commercial product (HOSTAPUR® OSB).

The invention claimed is:

1. A mineral foam containing water, mineral particles, wherein the mineral particles are particles of plaster, water-repellent agents, and a combination of surfactants comprising:
   at least one first surfactant (S1) bearing at least one sulfate group; and
   at least one second surfactant (S2) that is amphoteric.

2. The mineral foam as claimed in claim 1, wherein the first surfactant is selected from the group consisting of:
   alkyl ether sulfates;
   alkyl sulfates; and
   mixtures of two or more of these compounds.

3. The mineral foam as claimed in claim 1, wherein the second surfactant is selected from the group consisting of:
   amine oxides;
   glycinates;
   sultaines; and
   mixtures of two or more of these compounds.

4. The mineral foam as claimed in claim 1, suitable for the formation of lightweight building materials.

5. The mineral foam as claimed in claim 2, wherein alkyl ether sulfates are C8-C18 alkyl ether sulfates.

6. The mineral foam as claimed in claim 5, wherein C8-C18 alkyl ether sulfates are C12 and C13 alkyl ether sulfates.

7. The mineral foam as claimed in claim 2, wherein alkyl sulfates are C8-C18 alkyl sulfates.

8. The mineral foam as claimed in claim 7, wherein C8-C18 alkyl sulfates are C12 alkyl sulfates.

9. A process for forming a stable foam, the process comprising forming the foam with a combination of surfactants comprising:
   at least one first surfactant (S1) bearing at least one sulfate group; and
   at least one second surfactant (S2) that is amphoteric;
and contacting the foam with mineral particles, wherein the mineral particles are particles of plaster.

* * * * *